Sept. 12, 1950 — C. M. McCARTHY — 2,521,862
CUTTING DEVICE
Filed May 17, 1947
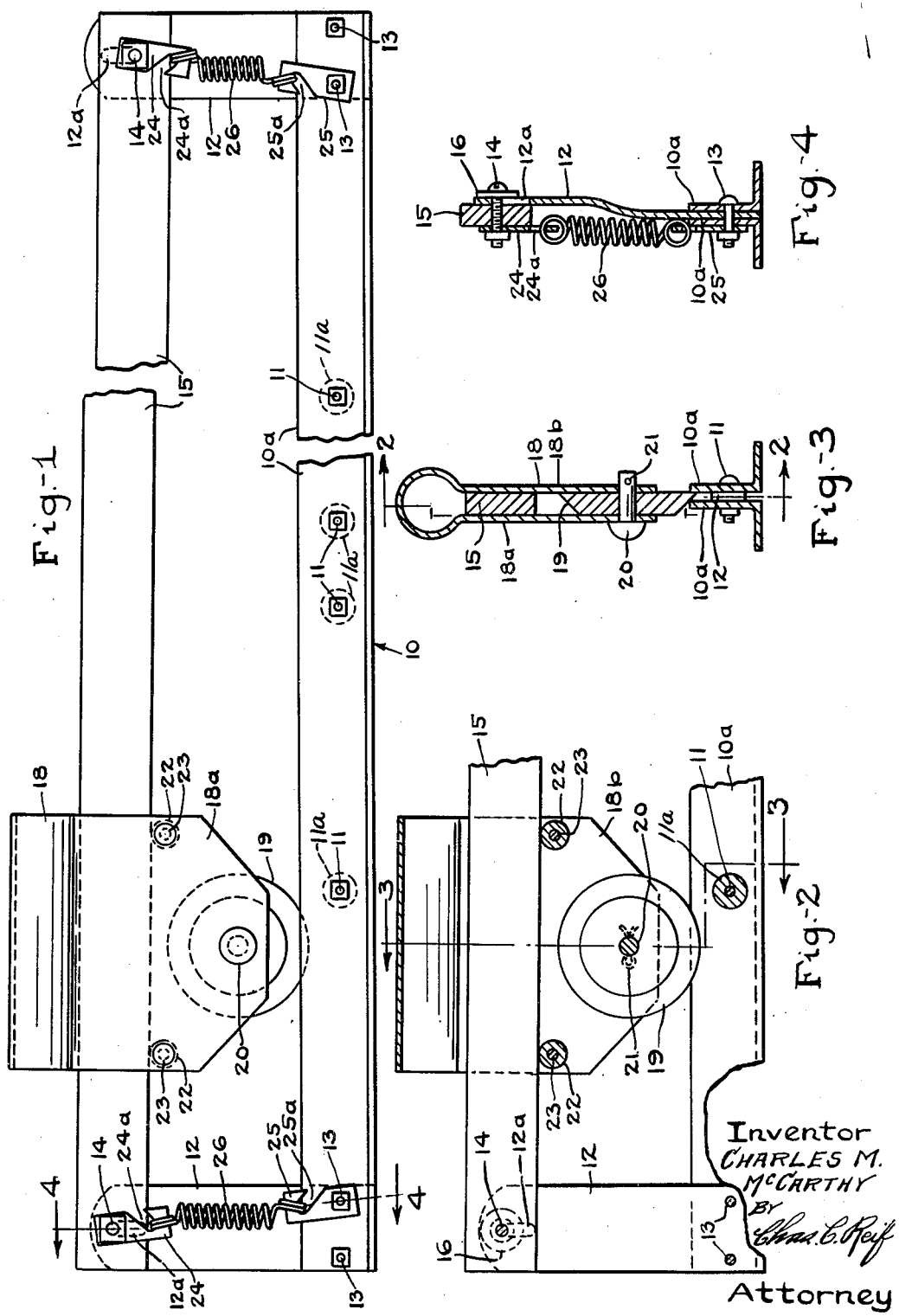
Inventor
CHARLES M. McCARTHY
By Chas. C. Reif
Attorney Patented Sept. 12, 1950

2,521,862

UNITED STATES PATENT OFFICE 2,521,862

CUTTING DEVICE

Charles M. McCarthy, Minneapolis, Minn.

Application May 17, 1947, Serial No. 748,801

1 Claim. (Cl. 164—77)

This invention relates to a cutter bar structure. While the structure could have many applications, it is specifically described as a cutter for wire cloth or screen and is an improvement on the structure shown in applicant's prior patent, No. 1,708,585, granted April 9, 1929.

It is an object of this invention to provide a cutter bar, a cutter movable along said bar, an elongated member disposed above said bar and supporting said cutter, together with tensile resilient means, such as tensile coiled springs, adjacent the ends of said bar and member for urging said member toward said bar and thus urging said cutter toward said bar.

It is a further object of the invention to provide a base member comprising a cutter bar, standards adjacent the ends of said base, an elongated bar above said base, a carriage movable on said elongated bar, a cutter mounted in said carriage and engaging said cutter bar, together with tensile resilient means, such as tensile coiled springs, connected to said base and elongated bar adjacent the ends thereof respectively for moving said elongated bar and cutter toward said base.

It is more specifically an object of the invention to provide a base comprising spaced elongated members, one of which forms a cutter bar, standards at the ends of said base, an elongated bar disposed above said base, a carriage movable on said elongated bar, a cutter carried by said carriage preferably in the shape of a cutter wheel having a beveled edge, which edge is disposed between said first mentioned members, together with tensile coiled springs connected to said elongated bar and to said base for moving said elongated bar and cutter toward said base.

These and other objects and advantages of the invention will be fully set forth in the following description made in connection with the accompanying drawings in which like reference characters refer to similar parts throughout the several views and in which:

Fig. 1 is a view in side elevation of a cutter bar structure;

Fig. 2 is a partial view in vertical section taken on line 2—2 of Fig. 3, as indicated by the arrows;

Fig. 3 is a vertical section taken substantially on line 3—3 of Fig. 2, as indicated by the arrows; and Fig. 4 is a vertical section taken substantially on line 4—4 of Fig. 1, as indicated by the arrows.

Referring to the drawings, a device is shown comprising a base member 10, and while this might be variously formed, in the embodiment of the invention illustrated it is shown as formed of angle bars 10a having their horizontal flanges diverging and spaced a short distance apart, the same being connected by headed and nutted bolts 11 passing therethrough and through cylindrical spacing members 11a disposed between bars 10a. Adjacent the ends of base 10 are disposed standards or upstanding members 12 having their lower ends disposed between bars 10a and connected thereto by spaced headed and nutted bolts 13. Members 12 are offset slightly at their upper ends and are provided adjacent their upper ends with elongated vertically extending slots 12a. Headed and nutted bolts 14 extend through slots 12a and through holes in an elongated member or bar 15 which extends between members 12 and has its ends substantially flush with the remote sides of members 12. Washers 16 are disposed beneath the heads of bolts 14 and in engagement with members 12. A carriage 18 is provided and while this might be variously formed, in the embodiment of the invention illustrated it comprises a plate 18a bent along substantially its medial line into semi-cylindrical form and having side portions 18b extending from said semi-cylindrical portion in parallel relation. Bar 15 passes between said side portions 18b. Said side portions 18b have their lower ends beveled and a cutter wheel 19 is disposed between said side portions and journaled on a headed pin 20 passing through said side portions 18b at right angles thereto and held therein in any suitable manner, as by the cotter pin 21. Rollers 22 are disposed between the side portions 18b and journaled on rivets 23 having heads at the outer sides of plates 18b. The cutter wheel 19 has a beveled edge portion and this portion is disposed between members 10a, one flat side of wheel 19 engaging against the inner side of the vertical flange of one member 10a, which flange thus forms a cutter bar. A lug 24 formed of a small flat plate is apertured to have bolt 14 pass therethrough, said plate engaging the side of bar 15 and being engaged by the nut on bolt 14. There is one of the members 24 at each end of bar 15. Lug 24 has a slot 24a therein extending at an angle to the side of lug 24 and being open at said side. A lug 25 similar in structure to lug 24 is secured to one of the bolts 13 at each end of base 10. The slot 25a in lugs 25 has its open side directed downwardly while slots 24a have their open sides directed upwardly. A tensile coiled spring 26 has a ring or loop formed at one end and disposed in slot 24a and has a ring or loop formed at its lower end and disposed in slot 25a. There is a spring 26 at each end of the base 10.

In operation the wire screen cloth or other material to be cut is disposed above the vertical flanges of bars 10a. Cutter wheel 19 and carriage 18 will be at one end of base 10. With the material disposed, as stated, the operator now takes hold of the semi-cylindrical portion of carriage 18 which constitutes a handle and moves the carriage longitudinally of bar 15, thus moving cutter wheel 19 along the cutter bar formed by one of the members 10a, so that the material is cleanly and easily cut. The cutter wheel 19 as well as bar 15 and carriage 18 is urged downwardly by the tension of springs 26. The cutter wheel is thus kept in proper engaging relation to base 10 and the cutter bar. Bolts 14 move in slots 12a in the movement of bar 15.

It has been found that the tensile coiled springs 26 are a great improvement over the compression springs shown in the above identified patent. The springs 26 in the present case can be easily placed in position and easily removed when it is desired to remove the carriage or cutter. Springs 26 give a more uniform tension throughout the length of bar 15 than did the springs shown in the patent. As carriage 18 moves toward one end of base 10, the spring 26 adjacent said end is placed under greater tension than the spring at the opposite end and bar 15 thus has a sort of a rocking effect at its ends about bolt 14. The cutter wheel 19 is held against members 10a with substantially the same tension at all times. The tensile springs give a much more uniform tension than the compression springs shown in the patent. There is room for a longer spring and the tension can be varied by swinging the lugs 24 and 25 about their connecting pivots. When lugs 24 and 25 are swung laterally the loops at the ends of springs 26 can be pushed or wedged between said lugs and base portion 10a and bar 15 respectively. The compression springs do not have a sufficient range of compression. At times the pressure is too great and at other times insufficient. It was difficult to cut heavy material using the compression springs. The cutting wheel would lock. The tensile springs have a considerable range of expansion and are structurally and functionally a great improvement. The device has been amply demonstrated in actual practice, found to be very successful and efficient and is being commercially made.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claim.

What is claimed is:

A device of the class described having in combination, a base including an elongated member forming a cutter bar, an elongated bar above and substantially parallel to said base, members secured to said base and upstanding therefrom adjacent the ends thereof and having elongated vertically extending slots adjacent their upper ends, a carriage movable on said elongated bar, a cutter wheel supported by and journaled in said carriage, and having a beveled edge, said wheel having its edge portion disposed against and co-operating with said cutter bar, headed and nutted bolts passing through said second mentioned bar and said slots whereby said bolts are movable vertically in said slots and said bar is movable vertically, lugs through which said bolts pass, said lugs being normally clamped in position by said bolts but being swingable about said bolts when the nuts on said bolts are loosened, said lugs having open ended upwardly directed slots in one side thereof, tensile coiled springs having their ends disposed respectively in said slots, headed and nutted bolts extending through said base member, upwardly extending lugs through which said bolts pass, said lugs having downwardly directed open ended slots therein in which the other ends of said springs respectively are held whereby said wheel is held against said cutter bar with substantially uniform pressure and said carriage and wheel can be easily moved throughout the length of said second mentioned bar.

CHARLES M. McCARTHY.

REFERENCES CITED

The following references are of record in the file of this patent:

UNITED STATES PATENTS

| Number | Name | Date |
| --- | --- | --- |
| 1,448,723 | Brundage | Mar. 20, 1923 |
| 1,708,585 | McCarthy | Apr. 9, 1929 |
| 2,324,323 | Reynolds | July 13, 1943 |